(12) United States Patent
Sugawara et al.

(10) Patent No.: US 12,095,037 B2
(45) Date of Patent: Sep. 17, 2024

(54) NON-AQUEOUS ELECTROLYTE SOLUTION FOR BATTERY AND LITHIUM SECONDARY BATTERY

(71) Applicant: MITSUI CHEMICALS, INC., Tokyo (JP)

(72) Inventors: Kei Sugawara, Ichihara (JP); Satoko Fujiyama, Kisarazu (JP); Hitoshi Onishi, Chiba (JP)

(73) Assignee: MITSUI CHEMICALS, INC., Tokyo (JP)

( * ) Notice: Subject to any disclaimer, the term of this patent is extended or adjusted under 35 U.S.C. 154(b) by 711 days.

(21) Appl. No.: 17/262,559

(22) PCT Filed: Jul. 25, 2019

(86) PCT No.: PCT/JP2019/029276
§ 371 (c)(1),
(2) Date: Jan. 22, 2021

(87) PCT Pub. No.: WO2020/022452
PCT Pub. Date: Jan. 30, 2020

(65) Prior Publication Data
US 2021/0296703 A1    Sep. 23, 2021

(30) Foreign Application Priority Data
Jul. 26, 2018    (JP) .................. 2018-140490

(51) Int. Cl.
*H01M 10/0567* (2010.01)
*H01M 4/48* (2010.01)
(Continued)

(52) U.S. Cl.
CPC ....... *H01M 10/0567* (2013.01); *H01M 4/483* (2013.01); *H01M 4/587* (2013.01);
(Continued)

(58) Field of Classification Search
None
See application file for complete search history.

(56) References Cited

U.S. PATENT DOCUMENTS

2012/0308881 A1    12/2012  Tokuda et al.
2015/0229002 A1*    8/2015  Kawasoe .......... H01M 10/0567
                                                             429/188
(Continued)

FOREIGN PATENT DOCUMENTS

CN    105826560 A    8/2016
JP    4392726 B2    1/2010
(Continued)

OTHER PUBLICATIONS

Machine translation of KR20160002314 (Year: 2016).*
(Continued)

*Primary Examiner* — Wyatt P McConnell
(74) *Attorney, Agent, or Firm* — BUCHANAN, INGERSOLL & ROONEY PC

(57) ABSTRACT

A non-aqueous electrolyte solution for a battery, includes: an additive A which is at least one selected from the group consisting of compounds represented by the following Formula (A); an additive B which is at least one selected from the group consisting of lithium monofluorophosphate and lithium difluorophosphate; and an additive C which is at least one selected from the group consisting of compounds containing a sulfur-oxygen bond. In Formula (A), $R^1$ represents a fluorine atom, or a fluorinated hydrocarbon group having from 1 to 6 carbon atoms; and each of $R^2$ to $R^4$ independently represents a hydrogen atom, a fluorine atom, a hydrocarbon group having from 1 to 6 carbon atoms, or a fluorinated hydrocarbon group having from 1 to 6 carbon atoms.

(Continued)

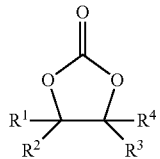

(A)

11 Claims, 3 Drawing Sheets

(51) Int. Cl.
*H01M 4/587* (2010.01)
*H01M 10/052* (2010.01)
*H01M 4/02* (2006.01)

(52) U.S. Cl.
CPC .... *H01M 10/052* (2013.01); *H01M 2004/027* (2013.01); *H01M 2300/0025* (2013.01)

(56) References Cited

U.S. PATENT DOCUMENTS

| | | |
|---|---|---|
| 2016/0211551 A1 | 7/2016 | Miyasato et al. |
| 2016/0023351 A1 | 8/2016 | Abe et al. |
| 2016/0233513 A1 | 8/2016 | Abe et al. |
| 2017/0214091 A1 | 7/2017 | Abe et al. |
| 2018/0241084 A1 | 8/2018 | Miyasato et al. |
| 2018/0375158 A1 | 12/2018 | Morinaka et al. |
| 2019/0273248 A1 | 9/2019 | Yamada et al. |
| 2019/0280300 A1* | 9/2019 | Maeda .................. H01M 4/525 |

FOREIGN PATENT DOCUMENTS

| | | |
|---|---|---|
| JP | 2011-187440 A | 9/2011 |
| JP | 4976715 B2 | 7/2012 |
| JP | 5524347 B2 | 6/2014 |
| JP | 2017045722 A | 3/2017 |
| JP | 2018081753 A | 5/2018 |
| KR | 20160002314 A | 1/2016 |
| WO | 2015/045989 A1 | 4/2015 |
| WO | WO-2015/046304 A1 | 4/2015 |
| WO | WO-2016/017809 A1 | 2/2016 |
| WO | WO-2017/111143 A1 | 6/2017 |
| WO | WO-2018/097212 A1 | 5/2018 |

OTHER PUBLICATIONS

International Search Report (PCT/ISA/210) with an English translation, and Written Opinion (PCT/ISA/237) mailed on Oct. 21, 2019, by the Japanese Patent Office as the International Searching Authority for International Application No. PCT/JP2019/029276.

* cited by examiner

NON-AQUEOUS ELECTROLYTE SOLUTION FOR BATTERY AND LITHIUM SECONDARY BATTERY

TECHNICAL FIELD

The present disclosure relates to a non-aqueous electrolyte solution for a battery and a lithium secondary battery.

BACKGROUND ART

Various investigations have been performed on non-aqueous electrolyte solutions for use in batteries (such as lithium secondary batteries).

For example, Patent Document 1 discloses a non-aqueous electrolyte solution having an excellent safety, a high conductivity, and a low viscosity. This non-aqueous electrolyte solution is characterized by being composed of: [A] non-aqueous solvent including a fluorinated carbonate, a cyclic carbonate, and an acyclic carbonate, wherein (i) the content of the cyclic carbonate is from 2 to 63% by mole, (ii) the content of the acyclic carbonate is from 2 to 63% by mole, and (iii) the content of the fluorinated carbonate is from 60 to 96% by mole (with the proviso that the total of (i) to (iii) does not exceed 100% by mole), and wherein the fluorinated carbonate is a compound having a specific chemical structure; and [B] an electrolyte.

Further, Patent Document 2 discloses a non-aqueous electrolyte solution which allows for reducing a decrease in capacity of a battery associated with a charging and discharging cycle at a high temperature, and reducing the generation of gas during storage at a high temperature, in an electrochemical device (particularly, in a high-voltage lithium secondary battery) whose positive electrode potential in a fully charged state is 4.35 V or more with respect to the potential of metal lithium. This non-aqueous electrolyte solution is a non-aqueous electrolyte solution for an electrochemical device whose positive electrode potential in a fully charged state is 4.35 V or more with respect to the potential of metal lithium, wherein the electrolyte solution is composed of: a non-aqueous solvent containing, as major components, a cyclic carbonate and an acyclic carbonate; and an electrolyte solute; wherein 60% by weight or more of the cyclic carbonate is 4-fluoroethylene carbonate; 25% by weight or more of the acyclic carbonate is at least one fluorinated acyclic carbonate selected from the group consisting of methyl-2,2,2-trifluoroethylcarbonate, ethyl-2,2,2-trifluoroethylcarbonate and di-2,2,2-trifluoroethylcarbonate; and the weight ratio of the cyclic carbonate and the acyclic carbonate is from 3:97 to 35:65.

Patent Document 3 discloses a non-aqueous electrolyte solution capable of significantly reducing a decrease in open circuit voltage during the storage of a battery in a charged state, while improving capacity maintenance performance of the battery. This non-aqueous electrolyte solution contains a cyclic sulfate compound having a specific structure.

Patent Document 1: Japanese Patent (JP-B) No. 4392726
Patent Document 2: JP-B No. 4976715
Patent Document 3: JP-B No. 5524347

SUMMARY OF INVENTION

Technical Problem

However, there is a case in which a further reduction in battery resistance after storage is required for a battery including a non-aqueous electrolyte solution containing a specific fluorinated cyclic carbonate, such as 4-fluoroethylene carbonate (specifically, a compound represented by Formula (A) to be described later; the same shall apply hereinafter).

An object of one aspect of the present disclosure is to provide a non-aqueous electrolyte solution for a battery which allows for a reduction in battery resistance after storage, while being a non-aqueous electrolyte solution containing a specific fluorinated cyclic carbonate.

An object of another aspect of the present disclosure is to provide a lithium secondary battery in which battery resistance after storage is reduced, while being a lithium secondary battery including a non-aqueous electrolyte solution containing a specific fluorinated cyclic carbonate.

Solution to Problem

The means for solving the above mentioned problems includes the following embodiments.

<1> A non-aqueous electrolyte solution for a battery, comprising:

an additive A which is at least one selected from the group consisting of compounds represented by the following Formula (A);

an additive B which is at least one selected from the group consisting of lithium monofluorophosphate and lithium difluorophosphate; and an additive C which is at least one selected from the group consisting of compounds containing a sulfur-oxygen bond:

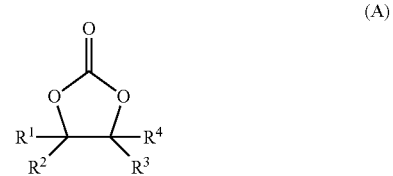

(A)

wherein, in Formula (A), $R^1$ represents a fluorine atom, or a fluorinated hydrocarbon group having from 1 to 6 carbon atoms; and each of $R^2$ to $R^4$ independently represents a hydrogen atom, a fluorine atom, a hydrocarbon group having from 1 to 6 carbon atoms, or a fluorinated hydrocarbon group having from 1 to 6 carbon atoms.

<2> The non-aqueous electrolyte solution for a battery according to <1>, wherein the additive C is at least one selected from the group consisting of a cyclic sulfate compound, a cyclic sulfonate compound, a substituted or unsubstituted sulfobenzoic anhydride, a fluorosulfonyl compound, and a lithium sulfonate compound.

<3> The non-aqueous electrolyte solution for a battery according to <1> or <2>, wherein the additive C is at least one selected from the group consisting of a compound represented by the following Formula (C1), a compound represented by the following Formula (C2), a compound represented by the following Formula (C3), a compound represented by the following Formula (C4), and a compound represented by the following Formula (C5):

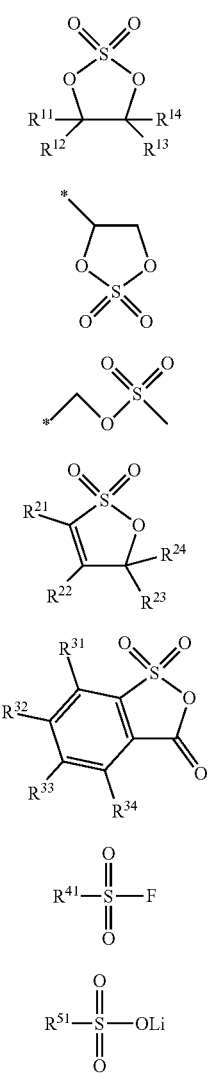

(C1)

(1a)

(1b)

(C2)

(C3)

(C4)

(C5)

wherein, in Formula (C1), each of $R^{11}$ to $R^{14}$ independently represents a hydrogen atom, a hydrocarbon group having from 1 to 6 carbon atoms, a group represented by Formula (1a), or a group represented by Formula (1b); wherein, in Formula (1a) and Formula (1b), * represents a bonding position;

wherein, in Formula (C2), each of $R^2$ to $R^{24}$ independently represents a hydrogen atom, a fluorine atom, a hydrocarbon group having from 1 to 6 carbon atoms, or a fluorinated hydrocarbon group having from 1 to 6 carbon atoms;

wherein, in Formula (C3), each of $R^3$ to $R^{14}$ independently represents a hydrogen atom, a halogen atom, a hydrocarbon group having from 1 to 6 carbon atoms, a halogenated hydrocarbon group having from 1 to 6 carbon atoms, a hydrocarbonoxy group having from 1 to 6 carbon atoms, or a halogenated hydrocarbonoxy group having from 1 to 6 carbon atoms;

wherein, in Formula (C4), $R^{41}$ represents a fluorine atom, a hydrocarbon group having from 1 to 6 carbon atoms, a hydrocarbonoxy group having from 1 to 6 carbon atoms, or a fluorinated hydrocarbon group having from 1 to 6 carbon atoms; and wherein, in Formula (C5), $R^{51}$ represents a fluorine atom, a hydrocarbon group having from 1 to 6 carbon atoms, a hydrocarbonoxy group having from 1 to 6 carbon atoms, or a fluorinated hydrocarbon group having from 1 to 6 carbon atoms.

<4> The non-aqueous electrolyte solution for a battery according to any one of <1> to <3>, which is used for a battery comprising a negative electrode active material containing a graphite material.

<5> The non-aqueous electrolyte solution for a battery according to <4>, wherein the negative electrode active material further comprises a silicon oxide represented by the following Composition Formula (1):

$SiO_X$   Composition Formula (1)

wherein, in Composition Formula (1), X represents a number from 0.5 to less than 1.6.

<6> The non-aqueous electrolyte solution for a battery according to any one of <1> to <5>, wherein a content of the additive A is from 0.001% by mass to 20% by mass with respect to a total amount of the non-aqueous electrolyte solution for a battery.

<7> The non-aqueous electrolyte solution for a battery according to any one of <1> to <6>, wherein a content of the additive B is from 0.001% by mass to 10% by mass with respect to a total amount of the non-aqueous electrolyte solution for a battery.

<8> The non-aqueous electrolyte solution for a battery according to any one of <1> to <7>, wherein a content of the additive C is from 0.001% by mass to 10% by mass with respect to a total amount of the non-aqueous electrolyte solution for a battery.

<9> A lithium secondary battery comprising:
a positive electrode;
a negative electrode comprising a negative electrode active material containing a graphite material; and
the non-aqueous electrolyte solution for a battery according to any one of <1> to <8>.

<10> The lithium secondary battery according to <9>, wherein the negative electrode active material further comprises a silicon oxide represented by the following Composition Formula (1):

$SiO_X$   Composition Formula (1)

wherein, in Composition Formula (1), X represents a number from 0.5 to less than 1.6.

<11> A lithium secondary battery obtained by charging and discharging the lithium secondary battery according to <9> or <10>.

Advantageous Effects of Invention

One aspect of the present disclosure provides a non-aqueous electrolyte solution for a battery which allows for a reduction in battery resistance after storage, while being a non-aqueous electrolyte solution containing a specific fluorinated cyclic carbonate.

Another aspect of the present disclosure provides a lithium secondary battery in which battery resistance after storage is reduced, while being a lithium secondary battery including a non-aqueous electrolyte solution containing a specific fluorinated cyclic carbonate.

DESCRIPTION OF EMBODIMENTS

Figure 1:
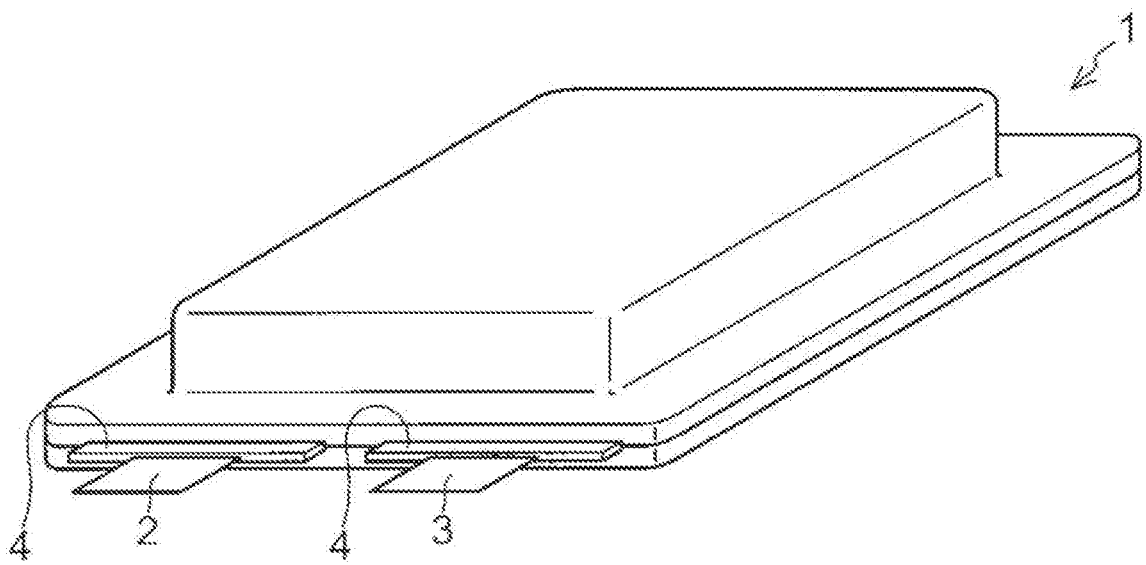
FIG. 1 is a schematic perspective view showing one example of a laminated battery, which is one example of a lithium secondary battery according to the present disclosure.

In the present specification, a numerical range expressed by "x to y" herein includes the values of x and y in the range as the minimum and maximum values, respectively.

In the present specification, the amount of each component in a composition refers, in a case in which a plurality of substances corresponding to each component are present in the composition, to the total amount of the plurality of substances present in the composition, unless otherwise specified.

[Non-Aqueous Electrolyte Solution for Battery]

A non-aqueous electrolyte solution for a battery according to the present disclosure (hereinafter, also simply referred to as the "non-aqueous electrolyte solution") includes:
  an additive A which is at least one selected from the group consisting of compounds represented by the following Formula (A);
  an additive B which is at least one selected from the group consisting of lithium monofluorophosphate and lithium difluorophosphate; and
  an additive C which is at least one selected from the group consisting of compounds containing a sulfur-oxygen bond.

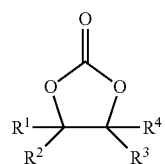

(A)

In Formula (A), $R^1$ represents a fluorine atom, or a fluorinated hydrocarbon group having from 1 to 6 carbon atoms; and each of $R^2$ to $R^4$ independently represents a hydrogen atom, a fluorine atom, a hydrocarbon group having from 1 to 6 carbon atoms, or a fluorinated hydrocarbon group having from 1 to 6 carbon atoms.

There is a case in which a further reduction in battery resistance after storage is required for a battery including a non-aqueous electrolyte solution containing the additive A.

According to the non-aqueous electrolyte solution according to the present disclosure, the battery resistance after storage can be reduced, while being a non-aqueous electrolyte solution containing the additive A.

The reason why such an effect is achieved is assumed as follows.

Battery resistance may increase in a battery including the non-aqueous electrolyte solution containing the additive A. The reductive decomposition of the additive A on the negative electrode, the oxidative decomposition of the resulting reductive decomposition product on the positive electrode, and the like, are thought to be responsible for an increase in the battery resistance.

In view of the above, the non-aqueous electrolyte solution according to the present disclosure contains the additive B and the additive C, in addition to the additive A. The combination of the additive A, the additive B, and the additive C is thought to allow the formation of a high-quality passivation film on electrode surfaces. It is thought that this high-quality passivation film acts to achieve a decrease in battery resistance before storage and/or a reduction in the increase in the battery resistance during storage, as a result of which the battery resistance after storage can be reduced.

<Additive A>

The additive A is at least one selected from the group consisting of compounds represented by Formula (A).

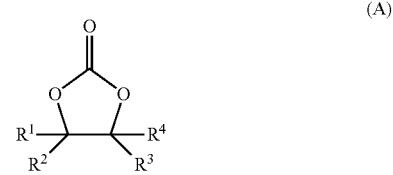

(A)

In Formula (A), $R^1$ represents a fluorine atom, or a fluorinated hydrocarbon group having from 1 to 6 carbon atoms; and each of $R^2$ to $R^4$ independently represents a hydrogen atom, a fluorine atom, a hydrocarbon group having from 1 to 6 carbon atoms, or a fluorinated hydrocarbon group having from 1 to 6 carbon atoms.

In the present disclosure, the fluorinated hydrocarbon group having from 1 to 6 carbon atoms refers to a hydrocarbon group having from 1 to 6 carbon atoms substituted with at least one fluorine atom.

In Formula (A), the fluorinated hydrocarbon group having from 1 to 6 carbon atoms represented by $R^1$ may be a linear fluorinated hydrocarbon group, or may be a fluorinated hydrocarbon group having a branched structure and/or a cyclic structure.

In Formula (A), examples of the fluorinated hydrocarbon group having from 1 to 6 carbon atoms represented by $R^1$ include: fluoroalkyl groups such as fluoromethyl group, difluoromethyl group, trifluoromethyl group, 2,2,2-trifluoroethyl group, 1,1,2,2-tetrafluoroethyl group, perfluoroethyl group, 2,2,3,3-tetrafluoropropyl group, perfluoropropyl group, perfluorobutyl group, perfluoropentyl group, perfluorohexyl group, perfluoroisopropyl group and perfluoroisobutyl group; and fluoroalkenyl groups such as 2-fluoroethenyl group, 2,2-difluoroethenyl group, 2-fluoro-2-propenyl group, 3,3-difluoro-2-propenyl group, 2,3-difluoro-2-propenyl group, 3,3-difluoro-2-methyl-2-propenyl group, 3-fluoro-2-butenyl group, perfluorovinyl group, perfluoropropenyl group and perfluorobutenyl group.

Among these, the fluorinated hydrocarbon group having from 1 to 6 carbon atoms represented by $R^1$ is preferably a fluoroalkyl group having from 1 to 6 carbon atoms, more preferably a fluoroalkyl group having from 1 to 3 carbon atoms, still more preferably a fluoromethyl group, a difluoromethyl group or a trifluoromethyl group, and particularly preferably a trifluoromethyl group.

In Formula (A), the hydrocarbon group having from 1 to 6 carbon atoms represented by any one of $R^2$ to $R^4$ may be a linear hydrocarbon group, or may be a hydrocarbon group having a branched structure and/or a cyclic structure.

In Formula (A), examples of the hydrocarbon group having from 1 to 6 carbon atoms represented by any one of $R^2$ to $R^4$ include:
  alkyl groups such as methyl group, ethyl group, n-propyl group, isopropyl group, 1-ethylpropyl group, n-butyl group, isobutyl group, see-butyl group, tert-butyl group, 2-methylbutyl group, 3,3-dimethylbutyl group, n-pentyl group, isopentyl group, neopentyl group, 1-methylpentyl group, n-hexyl group, isohexyl group, see-hexyl group and tert-hexyl group;

alkenyl groups such as vinyl group, 1-propenyl group, allyl group, 1-butenyl group, 2-butenyl group, 3-butenyl group, pentenyl group, hexenyl group, isopropenyl group, 2-methyl-2-propenyl group, 1-methyl-2-propenyl group and 2-methyl-1-propenyl group; and phenyl group.

Among these, the hydrocarbon group having from 1 to 6 carbon atoms represented by any one of $R^2$ to $R^4$ is preferably a phenyl group or an alkyl group having from 1 to 6 carbon atoms, more preferably an alkyl group having from 1 to 6 carbon atoms, still more preferably an alkyl group having from 1 to 3 carbon atoms, yet still more preferably a methyl group or an ethyl group, and particularly preferably a methyl group.

In Formula (A), $R^1$ is preferably a fluorine atom.

In Formula (A), each of $R^2$ to $R^4$ independently preferably represents a hydrogen atom, a fluorine atom or a methyl group, more preferably a hydrogen atom or a fluorine atom, and particularly preferably a hydrogen atom.

The compound represented by Formula (A) is:
preferably 4-fluoroethylene carbonate (abbreviated as FEC), 4,4-difluoroethylene carbonate, 4,5-difluoroethylene carbonate, or 4-trifluoromethyl ethylene carbonate;
more preferably 4-fluoroethylene carbonate, 4,4-difluoroethylene carbonate, or 4,5-difluoroethylene carbonate; and
particularly preferably 4-fluoroethylene carbonate.

The content of the additive A is preferably from 0.001% by mass to 20% by mass, more preferably from 0.001% by mass to 15% by mass, still more preferably from 0.001% by mass to 10% by mass, yet still more preferably from 0.001% by mass to 7% by mass, yet still more preferably from 0.001% by mass to 5% by mass, yet still more preferably from 0.01% by mass to 5% by mass, yet still more preferably from 0.1% by mass to 5% by mass, and yet still more preferably from 1% by mass to 5% by mass, with respect to the total amount of the non-aqueous electrolyte solution.

<Additive B>

The additive B is at least one selected from the group consisting of lithium monofluorophosphate ($Li_2PO_3F$) and lithium difluorophosphate ($LiPO_2F_2$; hereinafter, also referred to as "LiDFP").

It is preferred that lithium difluorophosphate is contained as the additive B.

The content of the additive B is preferably from 0.001% by mass to 10% by mass, more preferably from 0.001% by mass to 5.0% by mass, still more preferably from 0.001% by mass to 3.0% by mass, yet still more preferably from 0.01% by mass to 3.0% by mass, yet still more preferably from 0.1% by mass to 3.0% by mass, yet still more preferably from 0.1% by mass to 2.0% by mass, and yet still more preferably from 0.3% by mass to 1.5% by mass, with respect to the total amount of the non-aqueous electrolyte solution.

<Additive C>

The additive C is at least one selected from the group consisting of compounds containing a sulfur-oxygen bond.

It is thought that the sulfur-oxygen bond in the additive C is involved in the above described formation of a passivation film on the electrode surfaces.

The additive C is preferably at least one selected from the group consisting of a cyclic sulfate compound, a cyclic sulfonate compound (namely, a sultone compound), a substituted or unsubstituted sulfobenzoic anhydride, a fluorosulfonyl compound, and a lithium sulfonate compound.

The additive C is more preferably at least one selected from the group consisting of a compound represented by the following Formula (C1), a compound represented by the following Formula (C2), a compound represented by the following Formula (C3), a compound represented by the following Formula (C4), and a compound represented by the following Formula (C5).

The compound represented by the following Formula (C1) is an example of a cyclic sulfate compound;
the compound represented by the following Formula (C2) is an example of a cyclic sulfonate compound;
the compound represented by the following Formula (C3) is an example of a substituted or unsubstituted sulfobenzoic anhydride;
the compound represented by the following Formula (C4) is an example of a fluorosulfonyl compound; and
the compound represented by the following Formula (C5) is an example of a lithium sulfonate compound.

(Compound Represented by Formula (C1))

The compound represented by Formula (C1) is as follows.

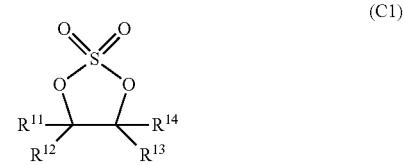

(C1)

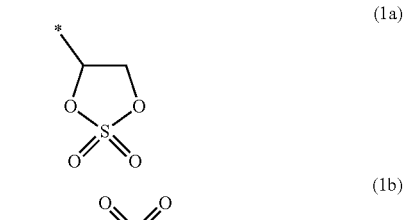

(1a)

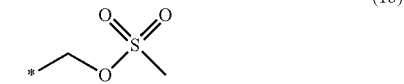

(1b)

In Formula (C1), each of $R^{11}$ to $R^{14}$ independently represents a hydrogen atom, a hydrocarbon group having from 1 to 6 carbon atoms, a group represented by Formula (1a), or a group represented by Formula (1b). In Formula (1a) and Formula (1b), * represents a bonding position.

In Formula (C1), the hydrocarbon group having from 1 to 6 carbon atoms represented by any one of $R^{11}$ to $R^{14}$ may be a linear hydrocarbon group, or may be a hydrocarbon group having a branched structure and/or a cyclic structure.

In Formula (C1), specific examples of the hydrocarbon group having from 1 to 6 carbon atoms represented by any one of $R^{11}$ to $R^{14}$ are the same as the specific examples of the hydrocarbon group having from 1 to 6 carbon atoms represented by any one of $R^2$ to $R^4$ in Formula (A).

In Formula (C1), the hydrocarbon group having from 1 to 6 carbon atoms represented by any one of $R^{11}$ to $R^{14}$ is preferably an alkyl group, an alkenyl group or an alkynyl group, more preferably an alkyl group or an alkenyl group, and particularly preferably an alkyl group.

In Formula (C1), the number of carbon atoms in the hydrocarbon group having from 1 to 6 carbon atoms represented by any one of $R^{11}$ to $R^{14}$ is preferably from 1 to 3, more preferably 1 or 2, and still more preferably 1.

Specific examples of the compound represented by Formula (C1) include compounds represented by the following Formulae (C1-1) to (C1-4) (hereinafter, also referred to as compounds (C1-1) to (C1-4), respectively). However, the compound represented by Formula (C1) is not limited to these specific examples.

Among these, the compounds (C1-1) to (C1-4) are particularly preferred.

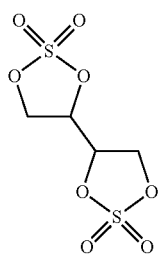

(C1-1)

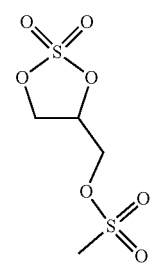

(C1-2)

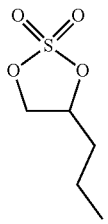

(C1-3)

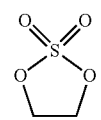

(C1-4)

(Compound Represented by Formula (C2))

The compound represented by Formula (C2) is as follows.

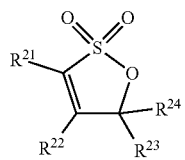

(C2)

In Formula (C2), each of $R^{21}$ to $R^{24}$ independently represents a hydrogen atom, a fluorine atom, a hydrocarbon group having from 1 to 6 carbon atoms, or a fluorinated hydrocarbon group having from 1 to 6 carbon atoms.

In Formula (C2), the hydrocarbon group having from 1 to 6 carbon atoms represented by any one of $R^{21}$ to $R^{24}$ may be a linear hydrocarbon group, or may be a hydrocarbon group having a branched structure and/or a cyclic structure.

In Formula (C2), specific examples of the hydrocarbon group having from 1 to 6 carbon atoms represented by any one of $R^{21}$ to $R^{24}$ are the same as the specific examples of the hydrocarbon group having from 1 to 6 carbon atoms represented by any one of $R^2$ to $R^4$ in Formula (A).

In Formula (C2), the hydrocarbon group having from 1 to 6 carbon atoms represented by any one of $R^{21}$ to $R^{24}$ is preferably an alkyl group, an alkenyl group or an alkynyl group, more preferably an alkyl group or an alkenyl group, and particularly preferably an alkyl group.

In Formula (C2), the number of carbon atoms in the hydrocarbon group having from 1 to 6 carbon atoms represented by any one of $R^{21}$ to $R^{24}$ is preferably from 1 to 3, more preferably 1 or 2, and still more preferably 1.

In Formula (C2), the fluorinated hydrocarbon group having from 1 to 6 carbon atoms represented by any one of $R^{21}$ to $R^{24}$ may be a linear fluorinated hydrocarbon group, or may be a fluorinated hydrocarbon group having a branched structure and/or a cyclic structure.

In Formula (C2), specific examples of the fluorinated hydrocarbon group having from 1 to 6 carbon atoms represented by any one of $R^{21}$ to $R^{24}$ are the same as the specific examples of the fluorinated hydrocarbon group having from 1 to 6 carbon atoms represented by any one of $R^2$ to $R^4$ in Formula (A).

In Formula (C2), the fluorinated hydrocarbon group having from 1 to 6 carbon atoms represented by any one of $R^{21}$ to $R^{24}$ is preferably a fluorinated alkyl group, a fluorinated alkenyl group or a fluorinated alkynyl group, more preferably a fluorinated alkyl group or a fluorinated alkenyl group, and particularly preferably a fluorinated alkyl group.

In Formula (C2), the number of carbon atoms in the fluorinated hydrocarbon group having from 1 to 6 carbon atoms represented by any one of $R^2$ to $R^{24}$ is preferably from 1 to 3, more preferably 1 or 2, and still more preferably 1.

In Formula (C2), each of $R^2$ to $R^{24}$ independently preferably represents a hydrogen atom, a fluorine atom, a methyl group, an ethyl group, a trifluoromethyl group or a pentafluoroethyl group, more preferably a hydrogen atom or a methyl group, and particularly preferably a hydrogen atom.

Specific examples of the compound represented by Formula (C2) include compounds represented by the following Formulae (C2-1) to (C2-21) (hereinafter, also referred to as compounds (C2-1) to (C2-21), respectively). However, the compound represented by Formula (C2) is not limited to these specific examples.

Among these, the compound (C2-1) (namely, 1,3-propene sultone; hereinafter, also referred to as "PRS") is particularly preferred.

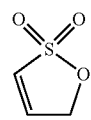

(C2-1)

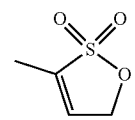

(C2-2)

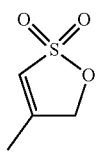

(C2-3)

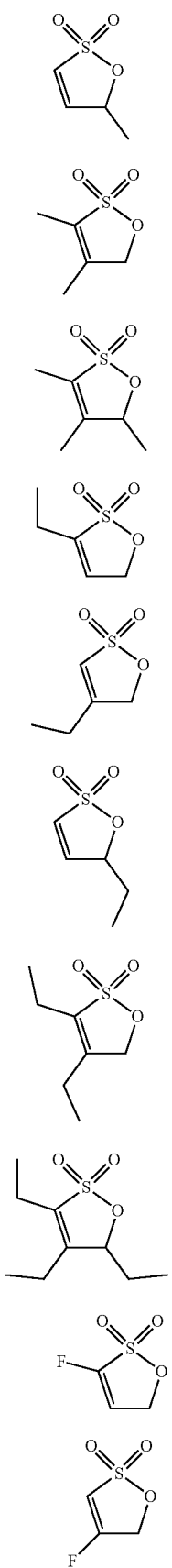
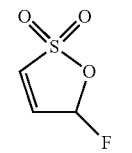
(C2-4)
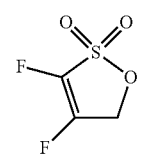
(C2-5)
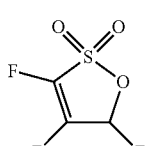
(C2-6)
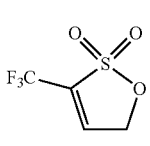
(C2-7)
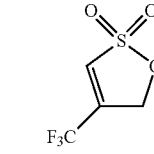
(C2-8)
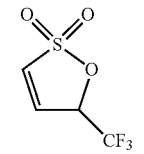
(C2-9)
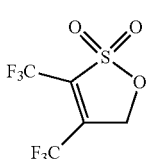
(C2-10)
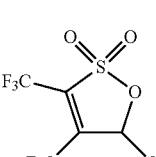
(C2-11)
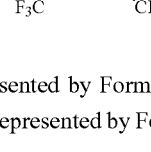
(C2-12)
(Compound Represented by Formula (C3))
The compound represented by Formula (C3) is as follows.
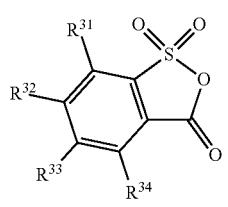
(C3)

In Formula (C3), each of $R^{31}$ to $R^{34}$ independently represents a hydrogen atom, a halogen atom, a hydrocarbon group having from 1 to 6 carbon atoms, a halogenated hydrocarbon group having from 1 to 6 carbon atoms, a hydrocarbonoxy group having from 1 to 6 carbon atoms, or a halogenated hydrocarbonoxy group having from 1 to 6 carbon atoms.

In Formula (C3), the halogen atom is preferably a fluorine atom, a chlorine atom, a bromine atom or an iodine atom, more preferably a fluorine atom, a chlorine atom or a bromine atom, still more preferably a fluorine atom or a chlorine atom, and yet still more preferably a fluorine atom.

In Formula (C3), the hydrocarbon group having from 1 to 6 carbon atoms represented by any one of $R^{31}$ to $R^{34}$ may be a linear hydrocarbon group, or may be a hydrocarbon group having a branched structure and/or a cyclic structure.

In Formula (C3), specific examples of the hydrocarbon group having from 1 to 6 carbon atoms represented by any one of $R^{31}$ to $R^{34}$ are the same as the specific examples of the hydrocarbon group having from 1 to 6 carbon atoms represented by any one of $R^2$ to $R^4$ in Formula (A).

In Formula (C3), the hydrocarbon group having from 1 to 6 carbon atoms represented by any one of $R^{31}$ to $R^{34}$ is preferably an alkyl group, an alkenyl group or an alkynyl group, more preferably an alkyl group or an alkenyl group, and particularly preferably an alkyl group.

In Formula (C3), the number of carbon atoms in the hydrocarbon group having from 1 to 6 carbon atoms represented by any one of $R^{31}$ to $R^{34}$ is preferably from 1 to 3, more preferably 1 or 2, and still more preferably 1.

In Formula (C3), the halogenated hydrocarbon group having from 1 to 6 carbon atoms represented by any one of $R^{31}$ to $R^{34}$ refers to a hydrocarbon group having from 1 to 6 carbon atoms substituted with at least one halogen atom.

The halogen atom in the halogenated hydrocarbon group is preferably a fluorine atom, a chlorine atom, a bromine atom or an iodine atom, more preferably a fluorine atom, a chlorine atom or a bromine atom, still more preferably a fluorine atom or a chlorine atom, and yet still more preferably a fluorine atom.

In Formula (C3), the halogenated hydrocarbon group having from 1 to 6 carbon atoms represented by any one of $R^{31}$ to $R^{34}$ may be a linear halogenated hydrocarbon group, or a halogenated hydrocarbon group having a branched structure and/or a cyclic structure.

In Formula (C3), the halogenated hydrocarbon group having from 1 to 6 carbon atoms represented by any one of $R^{31}$ to $R^{34}$ is preferably a halogenated alkyl group, a halogenated alkenyl group or a halogenated alkynyl group, more preferably a halogenated alkyl group or a halogenated alkenyl group, and particularly preferably a halogenated alkyl group.

In Formula (C3), the number of carbon atoms in the halogenated hydrocarbon group having from 1 to 6 carbon atoms represented by any one of $R^{31}$ to $R^{34}$ is preferably from 1 to 3, more preferably 1 or 2, and still more preferably 1.

In Formula (C3), the hydrocarbonoxy group having from 1 to 6 carbon atoms represented by any one of $R^{31}$ to $R^{34}$ may be a linear hydrocarbonoxy group, or may be a hydrocarbonoxy group having a branched structure and/or a cyclic structure.

In Formula (C3), the hydrocarbonoxy group having from 1 to 6 carbon atoms represented by any one of $R^{31}$ to $R^{34}$ is preferably an alkoxy group, an alkenyloxy group or an alkynyloxy group, more preferably an alkoxy group or an alkenyloxy group, and particularly preferably an alkoxy group.

In Formula (C3), the number of carbon atoms in the hydrocarbonoxy group having from 1 to 6 carbon atoms represented by any one of $R^{31}$ to $R^{34}$ is preferably from 1 to 3, more preferably 1 or 2, and still more preferably 1.

In Formula (C3), the halogenated hydrocarbonoxy group having from 1 to 6 carbon atoms represented by any one of $R^{31}$ to $R^{34}$ refers to a hydrocarbonoxy group having from 1 to 6 carbon atoms substituted with at least one halogen atom.

The halogen atom in the halogenated hydrocarbonoxy group is preferably a fluorine atom, a chlorine atom, a bromine atom or an iodine atom, more preferably a fluorine atom, a chlorine atom or a bromine atom, still more preferably a fluorine atom or a chlorine atom, and yet still more preferably a fluorine atom.

In Formula (C3), the halogenated hydrocarbonoxy group having from 1 to 6 carbon atoms represented by any one of $R^{31}$ to $R^{34}$ may be a linear halogenated hydrocarbonoxy group, or a halogenated hydrocarbonoxy group having a branched structure and/or a cyclic structure.

In Formula (C3), the halogenated hydrocarbonoxy group having from 1 to 6 carbon atoms represented by any one of $R^{31}$ to $R^{34}$ is preferably a halogenated alkoxy group, a halogenated alkenyloxy group or a halogenated alkynyloxy group, more preferably a halogenated alkoxy group or a halogenated alkenyloxy group, and particularly preferably a halogenated alkoxy group.

In Formula (C3), the number of carbon atoms in the halogenated hydrocarbonoxy group having from 1 to 6 carbon atoms represented by any one of $R^{31}$ to $R^{34}$ is preferably from 1 to 3, more preferably 1 or 2, and still more preferably 1.

In Formula (C3), each of $R^{31}$ to $R^{34}$ independently preferably represents a hydrogen atom, a fluorine atom, a chlorine atom, a methyl group, an ethyl group, a vinyl group, an ethynyl group, an allyl group, a trifluoromethyl group or a methoxy group, and more preferably a hydrogen atom.

Specific examples of the compound represented by Formula (C3) include sulfobenzoic anhydride,
fluorosulfobenzoic anhydride,
chlorobenzoic anhydride,
difluorosulfobenzoic anhydride,
dichlorosulfobenzoic anhydride,
trifluorosulfobenzoic anhydride,
tetrafluorosulfobenzoic anhydride,
methylsulfobenzoic anhydride,
dimethylsulfobenzoic anhydride,
trimethylsulfobenzoic anhydride,
ethylsulfobenzoic anhydride,
propylsulfobenzoic anhydride,
vinylsulfobenzoic anhydride,
ethynylsulfobenzoic anhydride,
allylsulfobenzoic anhydride,
(trifluoromethyl)sulfobenzoic anhydride,
di(trifluoro)(methyl)sulfobenzoic anhydride,
(trifluoromethoxy)sulfobenzoic anhydride,
(fluoro)(methyl)sulfobenzoic anhydride,
(chloroxmethyl)sulfobenzoic anhydride,
(fluoro)(methoxy)sulfobenzoic anhydride,
(chloro)(methoxy)sulfobenzoic anhydride,
di(fluoro)(methoxy)sulfobenzoic anhydride,
di(trifluoro)(vinyl)sulfobenzoic anhydride,
(fluoro)(vinyl)sulfobenzoic anhydride,
di(trifluoro)(ethynyl)sulfobenzoic anhydride, and
(fluoro)(ethynyl)sulfobenzoic anhydride.

Among these compounds, sulfobenzoic anhydride (hereinafter, also referred to as a "compound (C3-1)") is particularly preferred.

(Compound Represented by Formula (C4))

The compound represented by Formula (C4) is as follows.

(C4)

In Formula (C4), $R^{41}$ represents a fluorine atom, a hydrocarbon group having from 1 to 6 carbon atoms, a hydrocarbonoxy group having from 1 to 6 carbon atoms, or a fluorinated hydrocarbon group having from 1 to 6 carbon atoms.

In Formula (C4), the hydrocarbon group having from 1 to 6 carbon atoms represented by $R^{41}$ may be a linear hydrocarbon group, or may be a hydrocarbon group having a branched structure and/or a cyclic structure.

In Formula (C4), specific examples of the hydrocarbon group having from 1 to 6 carbon atoms represented by $R^{41}$ are the same as the specific examples of the hydrocarbon group having from 1 to 6 carbon atoms represented by any one of $R^2$ to $R^4$ in Formula (A).

In Formula (C4), the hydrocarbon group having from 1 to 6 carbon atoms represented by $R^{41}$ is preferably an alkyl group, an alkenyl group, an alkynyl group or a phenyl group, more preferably an alkyl group, an alkenyl group or an alkynyl group, still more preferably an alkyl group or an alkenyl group, and particularly preferably an alkyl group.

In Formula (C4), the number of carbon atoms in the hydrocarbon group having from 1 to 6 carbon atoms represented by $R^{41}$ is preferably from 1 to 3, more preferably 1 or 2, and still more preferably 1.

In Formula (C4), the hydrocarbonoxy group having from 1 to 6 carbon atoms represented by $R^{41}$ may be a linear hydrocarbonoxy group, or may be a hydrocarbonoxy group having a branched structure and/or a cyclic structure.

In Formula (C4), the hydrocarbonoxy group having from 1 to 6 carbon atoms represented by $R^{41}$ is preferably an alkoxy group, an alkenyloxy group or an alkynyloxy group, more preferably an alkoxy group or an alkenyloxy group, and particularly preferably an alkoxy group.

In Formula (C4), the number of carbon atoms in the hydrocarbonoxy group having from 1 to 6 carbon atoms represented by $R^{41}$ is preferably from 1 to 3, more preferably 1 or 2, and still more preferably 1.

In Formula (C4), the fluorinated hydrocarbon group having from 1 to 6 carbon atoms represented by $R^{41}$ may be a linear fluorinated hydrocarbon group, or may be a fluorinated hydrocarbon group having a branched structure and/or a cyclic structure.

In Formula (C4), specific examples of the fluorinated hydrocarbon group having from 1 to 6 carbon atoms represented by $R^{41}$ are the same as the specific examples of the fluorinated hydrocarbon group having from 1 to 6 carbon atoms represented by any one of $R^2$ to $R^4$ in Formula (A).

In Formula (C4), the fluorinated hydrocarbon group having from 1 to 6 carbon atoms represented by $R^{41}$ is preferably a fluorinated alkyl group, a fluorinated alkenyl group or a fluorinated alkynyl group, more preferably a fluorinated alkyl group or a fluorinated alkenyl group, and particularly preferably a fluorinated alkyl group.

In Formula (C4), the number of carbon atoms in the fluorinated hydrocarbon group having from 1 to 6 carbon atoms represented by $R^{41}$ is preferably from 1 to 3, more preferably 1 or 2, and still more preferably 1.

In Formula (C4), $R^{41}$ is preferably a fluorine atom, a hydrocarbon group having from 1 to 6 carbon atoms or a fluorinated hydrocarbon group having from 1 to 6 carbon atoms, more preferably a fluorine atom, a methyl group, an ethyl group, a trifluoromethyl group or a pentafluoroethyl group, and particularly preferably a methyl group.

The compound represented by Formula (C4) is:
preferably methanesulfonyl fluoride, ethanesulfonyl fluoride, propanesulfonyl fluoride, 2-propanesulfonyl fluoride, butanesulfonyl fluoride, 2-butanesulfonyl fluoride, hexanesulfonyl fluoride, trifluoromethanesulfonyl fluoride, perfluoroethanesulfonyl fluoride, perfluoropropanesulfonyl fluoride, perfluorobutanesulfonyl fluoride, etenesulfonyl fluoride, 1-propene-1-sulfonyl fluoride, or 2-propene-1-sulfonyl fluoride;

more preferably methanesulfonyl fluoride, ethanesulfonyl fluoride, propanesulfonyl fluoride, 2-propanesulfonyl fluoride, butanesulfonyl fluoride, 2-butanesulfonyl fluoride, hexane sulfonyl fluoride, trifluoromethanesulfonyl fluoride, perfluoroethanesulfonyl fluoride, perfluoropropanesulfonyl fluoride, or perfluorobutanesulfonyl fluoride;

still more preferably methanesulfonyl fluoride, ethanesulfonyl fluoride, propanesulfonyl fluoride, 2-propanesulfonyl fluoride, butanesulfonyl fluoride, 2-butanesulfonyl fluoride, or hexane sulfonyl fluoride;

yet still more preferably sulfonyl fluoride, ethanesulfonyl fluoride, or propanesulfonyl fluoride; and particularly preferably ethanesulfonyl fluoride.

(Compound Represented by Formula (C5))

The compound Formula (C5) is as follows.

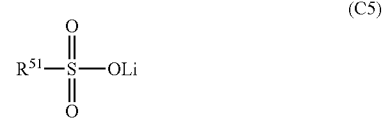

(C5)

In Formula (C5), $R^{51}$ represents a fluorine atom, a hydrocarbon group having from 1 to 6 carbon atoms, a hydrocarbonoxy group having from 1 to 6 carbon atoms, or a fluorinated hydrocarbon group having from 1 to 6 carbon atoms.

In Formula (C5), the fluorinated hydrocarbon group having from 1 to 6 carbon atoms represented by $R^1$ may be a linear fluorinated hydrocarbon group, or may be a fluorinated hydrocarbon group having a branched structure and/or a cyclic structure.

In Formula (C5), specific examples of the fluorinated hydrocarbon group having from 1 to 6 carbon atoms represented by $R^{51}$ are the same as the specific examples of the fluorinated hydrocarbon group having from 1 to 6 carbon atoms represented by each of $R^2$ to $R^4$ in Formula (A).

In Formula (C5), the fluorinated hydrocarbon group having from 1 to 6 carbon atoms represented by $R^{51}$ is preferably a fluorinated alkyl group, a fluorinated alkenyl group or a fluorinated alkynyl group, more preferably a fluorinated alkyl group or a fluorinated alkenyl group, and particularly preferably a fluorinated alkyl group.

In Formula (C5), the number of carbon atoms in the fluorinated hydrocarbon group having from 1 to 6 carbon atoms represented by R is preferably from 1 to 3, more preferably 1 or 2, and still more preferably 1.

In Formula (C5), the hydrocarbon group having from 1 to 6 carbon atoms represented by $R^{51}$ may be a linear hydrocarbon group, or may be a hydrocarbon group having a branched structure and/or a cyclic structure.

In Formula (C5), specific examples of the hydrocarbon group having from 1 to 6 carbon atoms represented by $R^{51}$ are the same as the specific examples of the hydrocarbon group having from 1 to 6 carbon atoms represented by any one of $R^2$ to $R^4$ in Formula (A).

In Formula (C5), the hydrocarbon group having from 1 to 6 carbon atoms represented by $R^{51}$ is preferably an alkyl group, an alkenyl group or an alkynyl group, more preferably an alkyl group or an alkenyl group, and particularly preferably an alkyl group.

In Formula (C5), the number of carbon atoms in the hydrocarbon group having from 1 to 6 carbon atoms represented by $R^{51}$ is preferably from 1 to 3, more preferably 1 or 2, and still more preferably 1.

In Formula (C5), the hydrocarbonoxy group having from 1 to 6 carbon atoms represented by $R^{51}$ may be a linear hydrocarbonoxy group, or may be a hydrocarbonoxy group having a branched structure and/or a cyclic structure.

In Formula (C5), the hydrocarbonoxy group having from 1 to 6 carbon atoms represented by R is preferably an alkoxy group, an alkenyloxy group or an alkynyloxy group, more preferably an alkoxy group or an alkenyloxy group, and particularly preferably an alkoxy group.

In Formula (C5), the number of carbon atoms in the hydrocarbonoxy group having from 1 to 6 carbon atoms represented by $R^{51}$ is preferably from 1 to 3, more preferably 1 or 2, and still more preferably 1.

In Formula (C5), $R^{51}$ is preferably a fluorinated hydrocarbon group having from 1 to 6 carbon atoms.

The compound represented by Formula (C5) is preferably lithium trifluoromethanesulfonate or lithium pentafluoroethanesulfonate, and particularly preferably lithium trifluoromethanesulfonate.

Further, compounds represented by the following Formulae (C5-1) to (C5-4) (hereinafter, also referred to as compounds (C5-1) to (C5-4), respectively) are also preferred as the compound represented by Formula (C5).

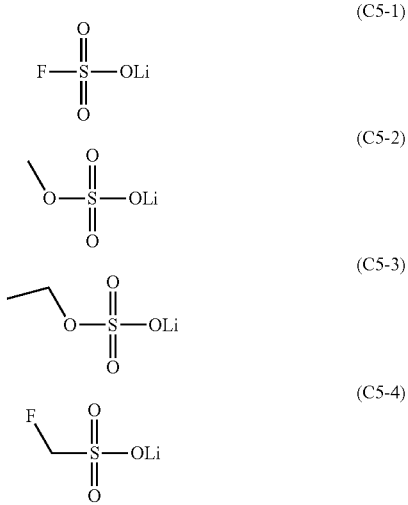

The content of the additive C is preferably from 0.001% by mass to 10% by mass, more preferably from 0.001% by mass to 5.0% by mass, still more preferably from 0.001% by mass to 3.0% by mass, yet still more preferably from 0.01% by mass to 3.0% by mass, yet still more preferably from 0.1% by mass to 3.0% by mass, yet still more preferably from 0.1% by mass to 2.0% by mass, yet still more preferably from 0.1% by mass to 1.0% by mass, and yet still more preferably from 0.2% by mass to 0.8% by mass, with respect to the total amount of the non-aqueous electrolyte solution.

From the viewpoint of more effectively obtaining the effect of reducing the battery resistance after storage, the total content of the additive B and the additive C is preferably from 0.01% by mass to 10% by mass, more preferably from 0.1% by mass to 5.0% by mass, still more preferably from 0.5% by mass to 3.0% by mass, and yet still more preferably from 1.0% by mass to 2.0% by mass, with respect to the total amount of the non-aqueous electrolyte solution.

From the viewpoint of more effectively obtaining the effect of reducing the battery resistance after storage, the ratio of the total content mass of the additive B and the additive C with respect to the content mass of the additive A (namely, a content mass ratio [(additive B+additive C)/additive A]) is preferably from 0.01 to 3.0, more preferably from 0.05 to 3.0, still more preferably from 0.05 to 2.0, yet still more preferably from 0.05 to less than 1.0, yet still more preferably from 0.1 to 0.9, and yet still more preferably from 0.2 to 0.8.

Next, other components of the non-aqueous electrolyte solution will be described. The non-aqueous electrolyte solution typically contains an electrolyte and a non-aqueous solvent.

<Non-Aqueous Solvent>

The non-aqueous electrolyte solution according to the present disclosure can contain a non-aqueous solvent.

The non-aqueous electrolyte solution can contain only one kind, or two or more kinds of non-aqueous solvents.

The non-aqueous solvent can be selected as appropriate from various known non-aqueous solvents.

For example, the non-aqueous solvent described in paragraphs 0069 to 0087 in Japanese Patent Application Laid-Open (JP-A) No. 2017-45723 can be used as the non-aqueous solvent.

The non-aqueous solvent preferably contains a cyclic carbonate compound and an acyclic carbonate compound.

In this case, the cyclic carbonate compound and the acyclic carbonate compound to be contained in the non-aqueous solvent may each be only one kind, or two or more kinds thereof.

Examples of the cyclic carbonate compound include ethylene carbonate, propylene carbonate, 1,2-butylene carbonate, 2,3-butylene carbonate, 1,2-pentylene carbonate, and 2,3-pentylene carbonate.

Among these compounds, ethylene carbonate and propylene carbonate having a high dielectric constant are suitably used. In the case of a battery including a negative electrode active material containing graphite, the non-aqueous solvent more preferably contains ethylene carbonate.

Examples of the acyclic carbonate compound include dimethyl carbonate, methyl ethyl carbonate, diethyl carbonate, methyl propyl carbonate, methyl isopropyl carbonate, ethyl propyl carbonate, dipropyl carbonate, methyl butyl carbonate, ethyl butyl carbonate, dibutyl carbonate, methyl pentyl carbonate, ethyl pentyl carbonate, dipentyl carbonate, methyl heptyl carbonate, ethyl heptyl carbonate, diheptyl carbonate, methyl hexyl carbonate, ethyl hexyl carbonate, dihexyl carbonate, methyl octyl carbonate, ethyl octyl carbonate, and dioctyl carbonate.

Specific examples of the combination of the cyclic and acyclic carbonates include combinations of: ethylene carbonate and dimethyl carbonate; ethylene carbonate and methyl ethyl carbonate; ethylene carbonate and diethyl carbonate; propylene carbonate and dimethyl carbonate; propylene carbonate and methyl ethyl carbonate; propylene carbonate and diethyl carbonate; ethylene carbonate, propylene carbonate and methyl ethyl carbonate; ethylene carbonate, propylene carbonate and diethyl carbonate; ethylene carbonate, dimethyl carbonate and methyl ethyl carbonate; ethylene carbonate, dimethyl carbonate and diethyl carbonate; ethylene carbonate, methyl ethyl carbonate and diethyl carbonate; ethylene carbonate, dimethyl carbonate, methyl ethyl carbonate and diethyl carbonate; ethylene carbonate, propylene carbonate, dimethyl carbonate and methyl ethyl carbonate; ethylene carbonate, propylene carbonate, dimethyl carbonate and diethyl carbonate; ethylene carbonate, propylene carbonate, methyl ethyl carbonate and diethyl carbonate; and ethylene carbonate, propylene carbonate, dimethyl carbonate, methyl ethyl carbonate and diethyl carbonate.

The cyclic carbonate compound and the acyclic carbonate compound are mixed such that the mass ratio of "cyclic carbonate compound:acyclic carbonate compound" is for example, from 5:95 to 80:20, preferably from 10:90 to 70:30, and particularly preferably from 15:85 to 55:45. When the compounds are mixed at such a ratio, it is possible to reduce an increase in the viscosity of the non-aqueous electrolyte solution, and to increase the degree of dissociation of the electrolyte. As a result, the conductivity of the non-aqueous electrolyte solution related to the charge-discharge characteristics of the resulting battery can be increased. In addition, the solubility of the electrolyte can further be increased. Accordingly, a non-aqueous electrolyte solution having an excellent electrical conductivity at normal temperature or at a low temperature can be obtained, making it possible to improve the load characteristics of the resulting battery at normal temperature to a low temperature.

The non-aqueous solvent may contain another compound other than the cyclic carbonate compound and the acyclic carbonate compound.

In this case, the non-aqueous solvent may contain only one kind or two or more kinds of other compounds.

Examples of the other compound include cyclic carboxylic acid ester compounds (such as γ-butyrolactone), cyclic sulfone compounds, cyclic ether compounds, acyclic carboxylic acid ester compounds, acyclic ether compounds, acyclic phosphoric acid ester compounds, amide compounds, acyclic carbamate compounds, cyclic amide compounds, cyclic urea compounds, boron compounds, and polyethylene glycol derivatives.

For details regarding these compounds, paragraphs 0069 to 0087 in JP-A No. 2017-45723 can be referred to, as appropriate.

The proportion of the cyclic carbonate compound and the acyclic carbonate compound in the non-aqueous solvent is preferably 80% by mass or more, more preferably 90% by mass or more, and still more preferably 95% by mass or more.

The proportion of the cyclic carbonate compound and the acyclic carbonate compound in the non-aqueous solvent may be 100% by mass.

The proportion of the non-aqueous solvent in the non-aqueous electrolyte solution is preferably 60% by mass or more, and more preferably 70% by mass or more.

The upper limit of the proportion of the non-aqueous solvent in the non-aqueous electrolyte solution is, for example, 99% by mass, preferably 97% by mass, and more preferably 90% by mass, although it varies depending on the contents of other components (such as the additives A to C, and the electrolyte).

<Electrolyte>

The non-aqueous electrolyte solution according to the present disclosure can contain an electrolyte.

The electrolyte preferably contains $LiPF_6$.

In this case, the proportion of $LiPF_6$ in the electrolyte is preferably from 1% by mass to 100% by mass, more preferably from 10% by mass to 100% by mass, and still more preferably from 50% by mass to 100% by mass.

The concentration of the electrolyte in the non-aqueous electrolyte solution according to the present disclosure is preferably from 0.1 mol/L to 3 mol/L, and more preferably from 0.5 mol/L to 2 mol/L.

The concentration of $LiPF_6$ in the non-aqueous electrolyte solution according to the present disclosure is preferably from 0.1 mol/L to 3 mol/L, and more preferably from 0.5 mol/L to 2 mol/L.

The electrolyte may contain a compound other than $LiPF_6$.

Examples of the compound other than $LiPF_6$ include:

tetraalkylammonium salts such as $(C_2H_5)_4NPF_6$, $(C_2H_5)_4NBF_4$, $(C2H_5)_4NClO_4$, $(C_2H_5)_4NAsF_6$, $(C_2H_5)_4N2SiF_6$, $(C_2H_5)_4NOSO_2C_kF_{(2k+1)}$ (k=an integer from 1 to 8), and $(C_2H_5)_4NPF_n[C_kF_{(2k+1)}]_{(6-n)}$ (n=an integer from 1 to 5, and k=an integer from 1 to 8); and lithium salts (namely, lithium salts other than $LiPF_6$) such as $LiBF_4$, $LiClO_4$, $LiAsF_6$, $Li_2SiF_6$, $LiOSO_2C_kF_{(2k+t)}$ (k=an integer from 1 to 8), $LiPF[C_kF_{(2k+1)}]_{(6-n)}$(n=an integer from 1 to 5, and k=an integer from 1 to 8), $LiC(SO_2R_7)(SO_2R^8)(SO_2R^9)$, $LiN(SO_2OR^{10})(SO_2OR^{11})$, and $LiN(SO_2R^{12})(SO_2R^{13})$ (wherein $R^1$ to $R^{13}$ may be the same as or different from each other, and are each a fluorine atom or a perfluoroalkyl group having from 1 to 8 carbon atoms).

<Applications>

The non-aqueous electrolyte solution according to the present disclosure can be used as an electrolyte solution for a battery.

The non-aqueous electrolyte solution according to the present disclosure can be used, for example, in a battery including a negative electrode active material containing a graphite material.

In general, in a battery which includes a non-aqueous electrolyte solution containing the additive A, such as FEC, and a negative electrode active material containing a graphite material, the battery resistance is prone to increase due to the reductive decomposition of the additive A on the graphite material, the oxidative decomposition of the resulting reductive decomposition product on the positive electrode, and the like.

However, since the non-aqueous electrolyte solution according to the present disclosure contains not only the additive A, but also the additive B and the additive C, the battery resistance after storage can be reduced even in a case in which the non-aqueous electrolyte solution is used in a battery including a negative electrode active material containing a graphite material.

In other words, when the non-aqueous electrolyte solution according to the present disclosure is used in a battery including a negative electrode active material containing a graphite material, the non-aqueous electrolyte solution according to the present disclosure allows for a higher degree of improvement (specifically, a higher degree of reduction in the battery resistance after storage).

The negative electrode active material containing a graphite material may further contain a silicon oxide (hereinafter, also simply referred to as "SiO$_X$") represented by the following Composition Formula (1).

In other words, the non-aqueous electrolyte solution according to the present disclosure may be used in a battery including a negative electrode active material containing a graphite material and SiO$_X$.

$$SiO_X \qquad \text{Composition Formula (1)}$$

wherein, in Composition Formula (1), X represents a number from 0.5 to less than 1.6.

In general, a battery including a negative electrode active material containing a graphite material and SiO$_X$ has an excellent battery capacity. However, in the negative electrode active material containing a graphite material and SiO$_X$, the range of expansion and contraction during the cycling of the battery is large, which may cause problems in cycle characteristics.

Regarding this point, the additive A to be contained in the non-aqueous electrolyte solution according to the present disclosure is thought to form LiF and a passivation film having an excellent mechanical flexibility, on SiO$_X$, by being reductively decomposed on the SiO$_X$. The thus formed LiF and passivation film serve to reduce the deterioration of the cycle characteristics of the battery.

Therefore, in a case in which the non-aqueous electrolyte solution according to the present disclosure is used in a battery including a negative electrode active material containing a graphite material and SiO$_X$, it is thought that the additive A acts to reduce the deterioration of the cycle characteristics of the battery caused by SiO$_X$.

Further, as described above, the combination of the additives A to C acts to reduce the battery resistance after storage.

Preferred embodiments of the negative electrode active material will be described later.

[Lithium Secondary Battery]

A lithium secondary battery according to the present disclosure includes: a positive electrode; a negative electrode; and the non-aqueous electrolyte solution according to the present disclosure.

Therefore, the lithium secondary battery according to the present disclosure has an excellent battery resistance after storage (namely, the battery resistance after storage of the battery is reduced).

<Negative Electrode>

The negative electrode includes a negative electrode active material containing a graphite material.

Examples of the graphite material include natural graphite and artificial graphite.

The negative electrode active material may contain only one kind, or two or more kinds of graphite materials.

The graphite material preferably contains natural graphite, and more preferably contains natural graphite coated with amorphous carbon (hereinafter, also referred to as "amorphous carbon-coated natural graphite").

In a case in which the graphite material contains natural graphite, the proportion of the natural graphite in the graphite material is preferably 50% by mass or more, more preferably 60%/o by mass or more, and still more preferably 80% by mass or more.

The proportion of the amorphous carbon in the natural graphite coated with amorphous carbon is preferably from 0.1% by mass to 10% by mass, more preferably from 0.2% by mass to 5% by mass, and still more preferably from 0.3% by mass to 3% by mass.

The graphite material is particularly preferably a graphite material whose interplanar spacing d(002) of the (002) plane, as measured by an X-ray analysis, is 0.340 nm or less.

Further, the graphite material preferably has a true density of 1.70 g/cm$^3$ or more.

In a case in which the negative electrode active material contains the graphite material, the content of the graphite material is preferably 80% by mass or more, more preferably 90% by mass or more, and still more preferably 92% by mass or more, with respect to the total amount of the negative electrode active material.

The negative electrode active material containing a graphite material may further contain SiO$_X$, namely, a silicon oxide represented by the following Composition Formula (1):

$$SiO_X \qquad \text{Composition Formula (1)}$$

wherein, in Composition Formula (1), X represents a number from 0.5 to less than 1.6.

SiO$_X$ may be coated with amorphous carbon.

For details regarding SiO$_X$, known literature such as WO 2013/094668 and JP-A No. 2016-143642 can be referred to, as appropriate.

In a case in which the negative electrode active material contains the graphite material and SiO$_X$, the content of SiO$_X$ is preferably from 1% by mass to 20% by mass, more preferably from 1% by mass to 10% by mass, and still more preferably from 2% by mass to 8% by mass, with respect to the total amount of the negative electrode active material.

In a case in which the negative electrode active material contains the graphite material and SiO$_X$, the content of the graphite material is preferably from 80% by mass to 99% by mass, more preferably from 90% by mass to 99% by mass, and still more preferably from 92% by mass to 98% by mass, with respect to the total amount of the negative electrode active material.

The negative electrode active material may contain another component other than those described above.

Examples of the other component include carbon materials other than the graphite material (such as carbon black, activated carbon, and amorphous carbon materials); metals and alloys, such as silicon, silicon alloys, tin, and tin alloys; and lithium titanate.

Examples of the amorphous carbon material include hard carbon, cokes, mesocarbon microbeads (MCMB) calcined at or below 1500° C., and mesophase pitch-based carbon fibers (MCF).

Further, natural graphite coated with an amorphous carbon material; natural graphite coated with a metal, such as gold, platinum, silver, copper or tin, or the like, may also be used as the negative electrode active material.

The negative electrode may contain a negative electrode current collector.

The material of the negative electrode current collector in the negative electrode is not particularly limited, and any of those conventionally known can be used arbitrarily.

Specific examples of the material of the negative electrode current collector include metallic materials such as copper, nickel, stainless steel and nickel-plated steel. Among these metals, copper is particularly preferred from the viewpoint of processability.

<Positive Electrode>

The positive electrode may include a positive electrode active material and a positive electrode current collector.

Example of the positive electrode active material in the positive electrode include: transition metal oxides and transition metal sulfides such as $MoS_2$, $TiS_2$, $MnO_2$, and $V_2O_5$; composite oxides composed of lithium and transition metals, such as $LiCoO_2$, $LiMnO_2$, $LiMn_2O_4$, $LiNiO_2$, $LiNi_xCo_{(1-X)}O_2$ [wherein 0<X<1], $Li_{1+a}Me_{1-a}O_2$ (wherein Me represents any one of transition metal elements including Mn, Ni, and Co; and a satisfies $1.0 \leq (1+a)/(1-a) \leq 1.6$) having an α-NaFeO$_2$ type crystal structure, $LiNi_xCo_yMn_zO_2$ [wherein x+y+z=1; 0<x<1; 0<y<1; and 0<z<1] (for example, $LiNi_{0.33}Co_{0.33}Mn_{0.3}O_2$, $LiNi_{0.5}Co_{0.2}Mn_{0.3}O_2$, etc.), $LiFePO_4$, and $LiMnPO_4$; and electroconductive polymer materials such as polyaniline, polythiophene, polypyrrole, polyacetylene, polyacene, dimercaptothiadiazole, and polyaniline composites. Among these materials, composite oxides composed of lithium and transition metals are particularly preferred. In a case in which the negative electrode is made of lithium metal or a lithium alloy, a carbon material can also be used as the positive electrode. Further, a mixture of a composite oxide of lithium and a transition metal with a carbon material can also be used as the positive electrode.

The positive electrode active materials described above may be used singly, or in combination of two or more kinds thereof. When the positive electrode active material has an insufficient electroconductivity, an electroconductive aid may be used along with the positive electrode active material, to form the positive electrode. Examples of the electroconductive aid include carbon materials such as carbon black, amorphous whisker, and graphite.

The material of the positive electrode current collector in the positive electrode is not particularly limited, and any of those conventionally known can be used arbitrarily.

Specific examples of the material of the positive electrode current collector include: metallic materials such as aluminum, aluminum alloys, stainless steel, nickel, titanium, and tantalum; and carbon materials such as carbon cloth and carbon paper.

<Separator>

The lithium secondary battery according to the present disclosure preferably includes a separator between the negative electrode and the positive electrode.

The separator is a film which electrically insulates the positive electrode and the negative electrode, and which allows lithium ions to permeate therethrough. Examples thereof include a porous film and a polymer electrolyte.

A microporous polymer film is suitably used as the porous film, and examples of the material of the microporous polymer film include polyolefins, polyimides, polyvinylidene fluoride, and polyesters.

The porous film is particularly preferably a porous polyolefin film, and specific examples thereof include a porous polyethylene film, a porous polypropylene film, and a multilayer film composed of a porous polyethylene film and a porous polypropylene film. The porous polyolefin film may be coated with another resin having an excellent thermal stability.

Examples of the polymer electrolyte include a polymer in which a lithium salt is dissolved, and a polymer swollen with an electrolyte solution.

The non-aqueous electrolyte solution according to the present disclosure may be used for the purpose of swelling a polymer to obtain a polymer electrolyte.

<Configuration of Battery>

The lithium secondary battery according to the present disclosure can have any of various known shapes, and can be formed into a cylindrical shape, a coin shape, a rectangular shape, a laminate shape, a film shape, or any other arbitrary shape. However, the basic structure of the battery is the same irrespective of the shape, and design modifications can be made depending on the purpose of the battery.

The lithium secondary battery according to the present disclosure may be, for example, a laminated battery.

Figure 2:
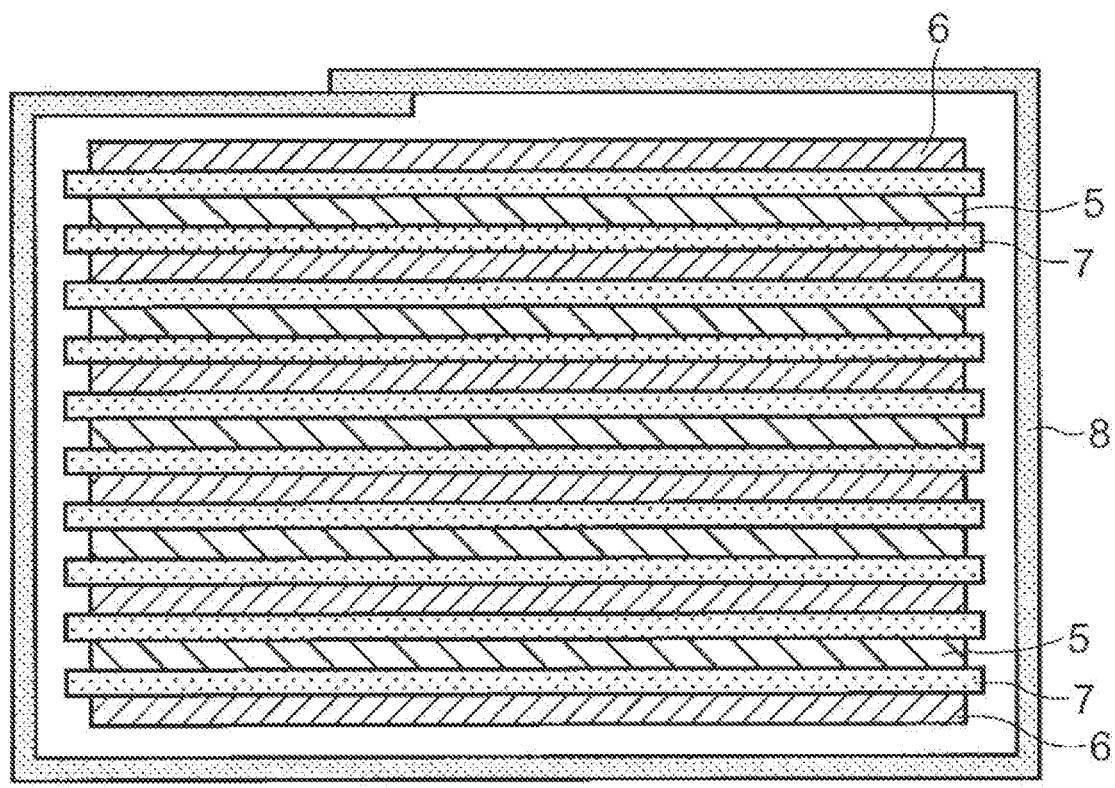
FIG. 2 is a schematic cross-sectional view in a thickness direction, of a laminated electrode body to be housed in the laminated battery shown in FIG. 1.

FIG. 1 is a schematic cross-sectional view showing one example of a laminated battery, which is one example of the lithium secondary battery according to the present disclosure, and FIG. 2 is a schematic cross-sectional view in the thickness direction, of a laminated electrode body to be housed in the laminated battery shown in FIG. 1.

The laminated battery shown in FIG. 1 includes a laminate exterior body 1 which houses therein the non-aqueous electrolyte solution (not shown in FIG. 1) and the laminated electrode body (not shown in FIG. 1), and whose interior is sealed by sealing a peripheral portion thereof. For example, a laminate exterior body made of aluminum is used as the laminate exterior body 1.

The laminated electrode body to be housed in the laminate exterior body 1 include, as shown in FIG. 2: a laminated body in which positive electrode plates 5 and negative electrode plates 6 are alternately disposed one on another in layers, with separators 7 respectively interposed therebetween; and a separator 8 surrounding the laminated body.

The positive electrode plates 5, the negative electrode plates 6, the separators 7, and the separator 8 are impregnated with the non-aqueous electrolyte solution according to the present disclosure.

Each of a plurality of the positive electrode plates 5 in the laminated electrode body is electrically connected to a positive electrode terminal 2 via a positive electrode tab (not shown), and a portion of the positive electrode terminal 2 is protruding outside the laminate exterior body 1 from the peripheral portion thereof (FIG. 1). The portion of the peripheral portion of the laminate exterior body 1 from which the positive electrode terminal 2 protrudes is sealed by an insulating seal 4.

In the same manner, each of a plurality of the negative electrode plates 6 in the laminated electrode body is electrically connected to a negative electrode terminal 3 via a negative electrode tab (not shown), and a portion of the negative electrode terminal 3 is protruding outside the laminate exterior body 1 from the peripheral portion thereof (FIG. 1). The portion of the peripheral portion of the laminate exterior body 1 from which the negative electrode terminal 3 protrudes is sealed by another insulating seal 4.

Further, the laminated battery according to the above described one example includes five pieces of the positive electrode plates 5 and six pieces of the negative electrode plates 6. In this battery, the positive electrode plates 5 and the negative electrode plates 6 are alternately disposed one on another in layers, with the separators 7 respectively interposed therebetween, in such an arrangement that both outermost layers are the negative electrode plates 6. However, it goes without saying that the number of the positive electrode plates, the number of the negative electrode plates, and the arrangement of these electrodes, in the laminated battery, are not limited to those in this example, and that various modifications may be made.

Another example of the lithium secondary battery according to the present disclosure may be, for example a coin battery.

Figure 3:
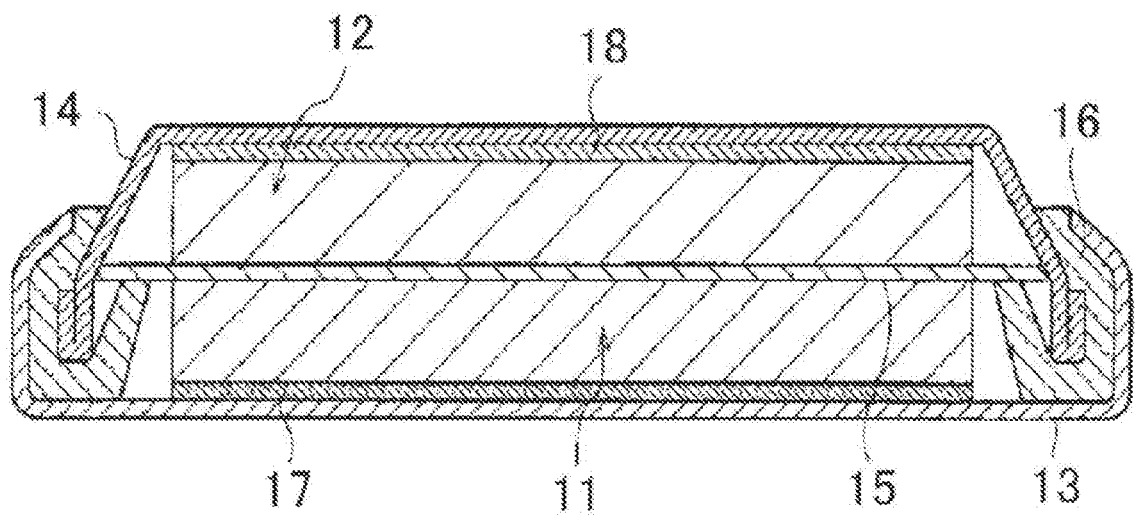
FIG. 3 is a schematic cross-sectional view of one example of a coin battery, which is another example of the lithium secondary battery according to the present disclosure.

FIG. 3 is a schematic perspective view showing one example of a coin battery, which is another example the lithium secondary battery according to the present disclosure.

In the coin battery shown in FIG. 3, a disc-shaped negative electrode 12; a separator 15 into which a non-aqueous electrolyte solution is injected; a disc-shaped positive electrode 11; and if necessary, spacer plates 17 and 18 made of stainless steel, aluminum, or the like; are layered in the order mentioned, and received, in this laminated state, between a positive electrode can 13 (hereinafter, also referred to as a "battery can") and a sealing plate 14 (hereinafter, also referred to as a "battery can lid"). The positive electrode can 13 and the sealing plate 14 are sealed by caulking with a gasket 16 interposed therebetween.

In this example, the non-aqueous electrolyte solution according to the present disclosure is used as the non-aqueous electrolyte solution to be injected into the separator 15.

The lithium secondary battery according to the present disclosure may be a lithium secondary battery obtained by charging and discharging a lithium secondary battery (a lithium secondary battery before being charged and discharged) which includes a negative electrode, a positive electrode, and the non-aqueous electrolyte solution according to the present disclosure.

In other words, the lithium secondary battery according to the present disclosure may be a lithium secondary battery (a lithium secondary battery which has been charged and discharged) obtained by: first producing a lithium secondary battery before being charged and discharged, which includes a negative electrode, a positive electrode, and the non-aqueous electrolyte solution according to the present disclosure; and then charging and discharging the thus prepared lithium secondary battery before being charged and discharged, one or more times.

The applications of the lithium secondary battery according to the present disclosure are not particularly limited, and the lithium secondary battery can be used in various known applications. The lithium secondary battery can be widely used in small-sized portable devices as well as large-sized products, such as, for example: laptop personal computers, mobile personal computers, mobile phones, headphone stereos, video/movie cameras, liquid crystal television sets, handy cleaners, electronic organizers, electronic calculators, radios, back-up power supply applications, motors, automobiles, electric cars, motorcycles, electric motorcycles, bicycles, electric bicycles, lighting devices, game machines, watches, electric tools, and cameras.

EXAMPLES

Examples of the present disclosure will now be described. However, the present disclosure is in no way limited to the following Examples.

In the following Examples, the term "addition amount" refers to the content of a component with respect to the total amount of the non-aqueous electrolyte solution to be finally obtained, and the term "wt %" represents % by mass.

Example 1

A coin battery (test battery) which is a lithium secondary battery was produced by the following procedure.
<Preparation of Negative Electrode>
Amorphous carbon-coated natural graphite (92 parts by mass), SiO (namely, a silicon oxide in which X in Composition Formula (1) is 1; manufactured by Osaka Titanium technologies Co., Ltd.) (5 parts by mass), carboxymethyl cellulose (1 part by mass) and SBR latex (2 parts by mass) were kneaded with water solvent, to prepare a negative electrode mixture slurry in the form of a paste.

Next, the thus obtained negative electrode mixture slurry was coated on a strip-shaped negative electrode current collector made of a copper foil and having a thickness of 10 μm, followed by drying. Thereafter, the resultant was compressed with a roll press, to obtain a sheet-like negative electrode composed of the negative electrode current collector and a negative electrode active material layer. At this time, the resulting negative electrode active material layer had a coating density of 12 mg/cm², and a packing density of 1.5 g/mL.

The amorphous carbon-coated natural graphite used above is natural graphite coated with amorphous carbon.

The proportion of natural graphite in the amorphous carbon-coated natural graphite is 99% by mass, and the proportion of the amorphous carbon included in the amorphous carbon-coated natural graphite is 1% by mass.
<Preparation of Positive Electrode>
$LiNi_{0.5}Mn_{0.3}Co_{0.2}O_2$ (90 parts by mass), acetylene black (5 parts by mass) and polyvinylidene fluoride (5 parts by mass) were kneaded, using N-methylpyrrolidinone as a solvent, to prepare a positive electrode mixture slurry in the form of a paste.

Next, the thus obtained positive electrode mixture slurry was coated on a strip-shaped positive electrode current collector made of an aluminum foil and having a thickness of 20 μm, followed by drying. Thereafter, the resultant was compressed with a roll press, to obtain a sheet-like positive electrode composed of the positive electrode current collector and a positive electrode active material layer. At this time, the resulting positive electrode active material layer had a coating density of 22 mg/cm², and a packing density of 2.5 g/mL.
<Preparation of Non-Aqueous Electrolyte Solution>
Ethylene carbonate (EC), dimethyl carbonate (DMC) and methyl ethyl carbonate (EMC), as non-aqueous solvents, were mixed at a ratio of 30:35:35 (mass ratio), to obtain a mixed solvent.

$LiPF_6$ as an electrolyte was dissolved in the thus obtained mixed solvent, such that the concentration of the $LiPF_6$ in the non-aqueous electrolyte solution to be finally obtained was 1.0 mol/L.

To the solution obtained as described above,
4-fluoroethylene carbonate (FEC) (addition amount: 3.0% by mass), as the additive A,
lithium difluorophosphate (LiDFP) (addition amount: 1.0% by mass), as the additive B; and
the following compound (C1-1) (a specific example of the compound represented by Formula (C1)) (addition amount: 0.5% by mass), as the additive C;
were added, to obtain a non-aqueous electrolyte solution.

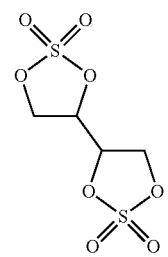

(C1-1)

<Production of Coin Battery>

The negative electrode and the positive electrode prepared as described above were punched into discs having diameters of 14 mm and 13 mm, respectively, to obtain a coin-shaped negative electrode and a coin-shaped positive electrode. Further, a microporous polyethylene film having a thickness of 20 μm was punched into a disc having a diameter of 17 mm, to obtain a separator.

The coin-shaped negative electrode, the separator, and the coin-shaped positive electrode thus obtained were disposed one on another in layers in the order mentioned, within a battery can (size 2032) made of stainless steel. Thereafter, 20 μL of the non-aqueous electrolyte solution was injected into the battery can, so that the separator, the positive electrode, and the negative electrode were impregnated with the non-aqueous electrolyte solution.

Subsequently, an aluminum plate (thickness: 1.2 mm, diameter: 16 mm) and a spring were placed on top of the positive electrode, and a battery can lid was caulked to the battery can with a gasket made of polypropylene interposed therebetween, to seal the resulting battery.

In this manner, a coin battery (namely, a coin-type lithium secondary battery) having a diameter of 20 mm and a height of 3.2 mm, and having the configuration shown in FIG. 3 was obtained.

<Evaluation of Battery Resistance>

The thus obtained coin battery was subjected to conditioning and aging, in this order, and the battery resistance before and after high temperature storage was evaluated for the coin battery after being subjected to aging.

The term "conditioning" as used herein refers to an operation of repeatedly charging and discharging the coin battery between 2.75 V and 4.2 V three times, in a thermostatic chamber controlled to 25° C.

Further, the term "aging" refers to an operation of storing the coin battery after being subjected to conditioning, in a SOC (State of Charge) of 100% at 60° C. for 72 hours.

The SOC of 100%, as used in the present Examples corresponds to a state charged with a charging voltage of 4.25 V.

The expression "high temperature storage" refers to an operation of storing the coin battery after being subjected to aging, in an SOC of 100% at 60° C. for 72 hours.

Hereinafter, the battery resistance was measured both under two temperature conditions of 25° C. and −20° C.

(Measurement of Battery Resistance Before High Temperature Storage)

The SOC (State of Charge) of the coin battery after aging was adjusted to 80%, and then the battery resistance (direct current resistance) before high temperature storage of the coin battery was measured, by the following method.

The above described coin battery whose SOC had been adjusted to 80%, was subjected to CC 10 s discharge at a discharge rate of 0.2 C.

The "CC 10 s discharge" as used herein refers to discharging at a constant current for 10 seconds.

The direct current resistance (Ω) was determined based on a current value (namely, the current value corresponding to a discharge rate of 0.2 C), and on the amount of decrease in voltage (=voltage before the start of discharge−voltage 10 seconds after the start of the discharge), in the above described "CC 10 s discharge at a discharge rate of 0.2 C", and the thus obtained direct current resistance (Ω) was defined as the battery resistance before high temperature storage (Ω) of the coin battery.

The battery resistance before high temperature storage (Ω) of a coin battery of Comparative Example A to be described later was also measured in the same manner.

Then the battery resistance before high temperature storage (relative value) of the coin battery of Example 1 was determined, taking the battery resistance before high temperature storage of the coin battery of Comparative Example A as 100.

The results are shown in Table 1.

(Measurement of Battery Resistance after High Temperature Storage)

The coin battery whose battery resistance before high temperature storage had been measured was subjected to CC-CV charging to 4.25 V at a charging rate of 0.2 C and at 25° C., to be adjusted to an SOC of 100%, and then stored in this state at a high temperature (namely, stored at 60° C. for 72 hours). The term "CC-CV charging" as used herein refers to charging at a "constant current-constant voltage".

The coin battery after being stored at a high temperature was adjusted to an SOC of 80%, and then the battery resistance after high temperature storage of the coin battery was measured in the same manner as the measurement of the battery resistance before high temperature storage.

The battery resistance after high temperature storage (Ω) of the coin battery of Comparative Example A to be described later was also measured in the same manner as described above.

The battery resistance after high temperature storage (relative value) of the coin battery of Example 1 was determined, taking the battery resistance after high temperature storage of the coin battery of Comparative Example A as 100.

The results are shown in Table 1.

Comparative Example A

The same operation as in Example 1 was carried out, except that the additive A, the additive B, and the additive C were not incorporated into the non-aqueous electrolyte solution. The results are shown in Table 1.

In Table 1, the symbol "−" indicates that the corresponding additive was not incorporated.

Comparative Example B

The same operation as in Example 1 was carried out, except that the additive B and the additive C were not incorporated into the non-aqueous electrolyte solution. The results are shown in Table 1.

Comparative Examples 1 to 3

The same operation as in Example 1 was carried out, except that the presence or absence of each of the additives A to C was changed as shown in Table 1. The results are shown in Table 1.

Example 101 and Comparative Examples 101 to 103

The same operation as in each of Example 1 and Comparative Examples 1 to 3 was carried out, except that the type of the additive C used was changed to PRS (namely, the following compound (C2-1); a specific example of the compound represented by Formula (C2)).

The results are shown in Table 1.

In each of these examples, the battery resistance before high temperature storage is represented as a relative value, when the battery resistance before high temperature storage of the coin battery of Comparative Example A is taken as 100, and the battery resistance after high temperature storage is represented as a relative value, when the battery resistance after high temperature storage of the coin battery of Comparative Example A is taken as 100.

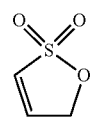

(C2-1) = PRS

Example 201 and Comparative Examples 201 to 203

The same operation as in each of Example 1 and Comparative Examples 1 to 3 was carried out, except that the type of the additive C used was changed to the following compound (C1-2) (a specific example of the compound represented by Formula (C1)).

The results are shown in Table 1.

In each of these examples, the battery resistance before high temperature storage is represented as a relative value, when the battery resistance before high temperature storage of the coin battery of Comparative Example A is taken as 100, and the battery resistance after high temperature storage is represented as a relative value, when the battery resistance after high temperature storage of the coin battery of Comparative Example A is taken as 100.

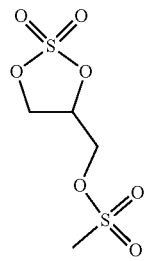

(C1-2)

Example 301 and Comparative Examples 301 to 303

The same operation as in each of Example 1 and Comparative Examples 1 to 3 was carried out, except that the type of the additive C used was changed to sulfobenzoic anhydride (specifically, the following compound (C3-1); a specific example of the compound represented by Formula (C3)).

The results are shown in Table 1.

In each of these examples, the battery resistance before high temperature storage is represented as a relative value, when the battery resistance before high temperature storage of the coin battery of Comparative Example A is taken as 100, and the battery resistance after high temperature storage is represented as a relative value, when the battery resistance after high temperature storage of the coin battery of Comparative Example A is taken as 100.

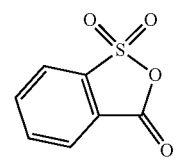

(C3-1)

TABLE 1

| | Additives in non-aqueous electrolyte solution | | | Battery resistance (25° C.) | | Battery resistance (−20° C.) | |
|---|---|---|---|---|---|---|---|
| | Additive A (addition amount; wt %) | Additive B (addition amount; wt %) | Additive C (addition amount; wt %) | Before high temperature storage (relative value) | After high temperature storage (relative value) | Before high temperature storage (relative value) | After high temperature storage (relative value) |
| Comparative Example A | — | — | — | 100 | 100 | 100 | 100 |
| Comparative Example B | FEC (3.0) | — | — | 114 | 113 | 128 | 130 |
| Example 1 | FEC (3.0) | LiDFP (1.0) | (C1-1) (0.5) | 110 | 96 | 117 | 101 |
| Comparative Example 1 | FEC (3.0) | — | (C1-1) (0.5) | 114 | 100 | 136 | 109 |
| Comparative Example 2 | — | LiDFP (1.0) | (C1-1) (0.5) | 102 | 111 | 104 | 109 |
| Comparative Example 3 | — | — | (C1-1) (0.5) | 124 | 126 | 117 | 111 |
| Example 101 | FEC (3.0) | LiDFP (1.0) | PRS (0.5) | 105 | 97 | 133 | 109 |
| Comparative Example 101 | FEC (3.0) | — | PRS (0.5) | 123 | 103 | 153 | 115 |

TABLE 1-continued

| | Additives in non-aqueous electrolyte solution | | | Battery resistance (25° C.) | | Battery resistance (−20° C.) | |
|---|---|---|---|---|---|---|---|
| | Additive A (addition amount; wt %) | Additive B (addition amount; wt %) | Additive C (addition amount; wt %) | Before high temperature storage (relative value) | After high temperature storage (relative value) | Before high temperature storage (relative value) | After high temperature storage (relative value) |
| Comparative Example 102 | — | LiDFP (1.0) | PRS (0.5) | 91 | 102 | 134 | 120 |
| Comparative Example 103 | — | — | PRS (0.5) | 105 | 101 | 124 | 120 |
| Example 201 | FEC (3.0) | LiDFP (1.0) | (C1-2) (0.5) | 102 | 89 | 102 | 89 |
| Comparative Example 201 | FEC (3.0) | — | (C1-2) (0.5) | 96 | 104 | 119 | 110 |
| Comparative Example 202 | — | LiDFP (1.0) | (C1-2) (0.5) | 87 | 95 | 100 | 110 |
| Comparative Example 203 | — | — | (C1-2) (0.5) | 98 | 115 | 97 | 97 |
| Example 301 | FEC (3.0) | LiDFP (1.0) | (C3-1) (0.5) | 108 | 97 | 125 | 94 |
| Comparative Example 301 | FEC (3.0) | — | (C3-1) (0.5) | 106 | 113 | 131 | 118 |
| Comparative Example 302 | — | LiDFP (1.0) | (C3-1) (0.5) | 101 | 110 | 111 | 98 |
| Comparative Example 303 | — | — | (C3-1) (0.5) | 126 | 123 | 125 | 111 |

As shown in Table 1, in the battery of Comparative Example B in which the non-aqueous electrolyte solution containing the additive A but not the additives B and C was used, the battery resistance increased both before and after high temperature storage, as compared to Comparative Example A in which the non-aqueous electrolyte solution which does not contain the additives A to C was used.

In the batteries of Examples 1 and 101 to 103 in each of which the non-aqueous electrolyte solution containing the additives A to C was used, the battery resistance after high temperature storage was reduced, as compared to Comparative Example B.

Based on the results of a series of the batteries of Example 1 and Comparative Examples 1 to 3, it can be seen that the effect of reducing the battery resistance after high temperature storage obtained in Example 1 is attributed to the combination of the additives A to C.

Likewise, based on the results of a series of the batteries of Example 101 and Comparative Examples 101 to 103, a series of the batteries of Example 201 and Comparative Examples 201 to 203, as well as a series of the batteries of Example 301 and Comparative Examples 301 to 303, it can be seen that the effect of reducing the battery resistance after high temperature storage is attributed to the combination of the additives A to C.

The disclosure of Japanese Patent Application No. 2018-140490 filed on Jul. 26, 2018 is incorporated herein by reference in their entirety. All publications, patent applications, and technical standards mentioned in the present specification are incorporated herein by reference to the same extent as if each individual publication, patent application, or technical standard was specifically and individually indicated to be incorporated by reference.

The invention claimed is:

1. A non-aqueous electrolyte solution for a battery, comprising:
   an additive A which is at least one selected from the group consisting of compounds represented by the following Formula (A);
   an additive B which is at least one selected from the group consisting of lithium monofluorophosphate and lithium difluorophosphate; and
   an additive C which is at least one selected from the group consisting of compounds containing a sulfur-oxygen bond:

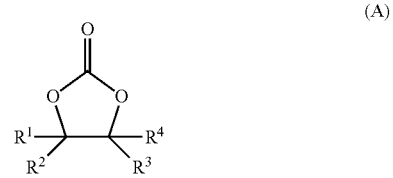

(A)

wherein, in Formula (A), $R^1$ represents a fluorine atom, or a fluorinated hydrocarbon group having from 1 to 6 carbon atoms; and each of $R^2$ to $R^4$ independently represents a hydrogen atom, a fluorine atom, a hydrocarbon group having from 1 to 6 carbon atoms, or a fluorinated hydrocarbon group having from 1 to 6 carbon atoms, wherein the additive C is at least one selected from the group consisting of a compound represented by the following Formula (C1), a compound represented by the following Formula (C3), a compound represented by the following Formula (C4), and a compound represented by the following Formula (C5):

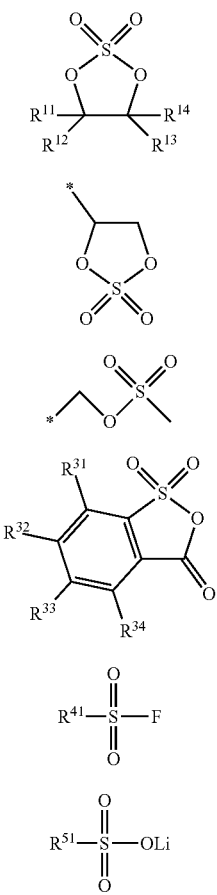

wherein, in Formula (C1), each of $R^{11}$ to $R^{14}$ independently represents a hydrogen atom, a hydrocarbon group having from 1 to 6 carbon atoms, a group represented by Formula (1a), or a group represented by Formula (1b); wherein, in Formula (1a) and Formula (1b), * represents a bonding position;

wherein, in Formula (C3), each of $R^{31}$ to $R^{34}$ independently represents a hydrogen atom, a halogen atom, a hydrocarbon group having from 1 to 6 carbon atoms, a halogenated hydrocarbon group having from 1 to 6 carbon atoms, a hydrocarbonoxy group having from 1 to 6 carbon atoms, or a halogenated hydrocarbonoxy group having from 1 to 6 carbon atoms;

wherein, in Formula (C4), $R^{41}$ represents a fluorine atom, a hydrocarbon group having from 1 to 6 carbon atoms, a hydrocarbonoxy group having from 1 to 6 carbon atoms, or a fluorinated hydrocarbon group having from 1 to 6 carbon atoms; and wherein, in Formula (C5), $R^{51}$ represents a fluorine atom, a hydrocarbon group having from 1 to 6 carbon atoms, a hydrocarbonoxy group having from 1 to 6 carbon atoms, or a fluorinated hydrocarbon group having from 1 to 6 carbon atoms.

2. The non-aqueous electrolyte solution for a battery according to claim 1, which is used for a battery comprising a negative electrode active material containing a graphite material.

3. The non-aqueous electrolyte solution for a battery according to claim 2, wherein the negative electrode active material further comprises a silicon oxide represented by the following Composition Formula (1):

$SiO_X$     Composition Formula (1)

wherein, in Composition Formula (1), X represents a number from 0.5 to less than 1.6.

4. The non-aqueous electrolyte solution for a battery according to claim 1, wherein a content of the additive A is from 0.001% by mass to 20% by mass with respect to a total amount of the non-aqueous electrolyte solution for a battery.

5. The non-aqueous electrolyte solution for a battery according to claim 1, wherein a content of the additive B is from 0.001% by mass to 10% by mass with respect to a total amount of the non-aqueous electrolyte solution for a battery.

6. The non-aqueous electrolyte solution for a battery according to claim 1, wherein a content of the additive C is from 0.001% by mass to 10% by mass with respect to a total amount of the non-aqueous electrolyte solution for a battery.

7. A lithium secondary battery comprising:
a positive electrode;
a negative electrode comprising a negative electrode active material containing a graphite material; and
the non-aqueous electrolyte solution for a battery according to claim 1.

8. The lithium secondary battery according to claim 7, wherein the negative electrode active material further comprises a silicon oxide represented by the following Composition Formula (1):

$SiO_X$     Composition Formula (1)

wherein, in Composition Formula (1), X represents a number from 0.5 to less than 1.6.

9. A lithium secondary battery obtained by charging and discharging the lithium secondary battery according to claim 7.

10. The non-aqueous electrolyte solution for a battery according to claim 3, wherein:
a content of the graphite material is 80% by mass or more with respect to a total amount of the negative electrode active material, and
a content of SiOX is from 1% by mass to 20% by mass with respect to the total amount of the negative electrode active material.

11. The lithium secondary battery according to claim 8, wherein:
a content of the graphite material is 80% by mass or more with respect to a total amount of the negative electrode active material, and
a content of SiOX is from 1% by mass to 20% by mass with respect to the total amount of the negative electrode active material.

* * * * *